United States Patent
Shanmugasundaram et al.

(10) Patent No.: US 9,336,823 B2
(45) Date of Patent: May 10, 2016

(54) PLAYING AUDIO IN TRICK-MODES

(75) Inventors: Ganesh Shanmugasundaram, Bangalore (IN); Sumit Jaiswal, Shajapur (IN)

(73) Assignee: NXP B.V., Eindhoven (NL)

( * ) Notice: Subject to any disclaimer, the term of this patent is extended or adjusted under 35 U.S.C. 154(b) by 239 days.

(21) Appl. No.: 14/345,446

(22) PCT Filed: Sep. 14, 2012

(86) PCT No.: PCT/EP2012/068064
§ 371 (c)(1),
(2), (4) Date: Aug. 19, 2014

(87) PCT Pub. No.: WO2013/050228
PCT Pub. Date: Apr. 11, 2013

(65) Prior Publication Data
US 2015/0078562 A1    Mar. 19, 2015

(30) Foreign Application Priority Data
Oct. 7, 2011    (IN) ............................ 2901/DEL/2011

(51) Int. Cl.
*G11B 20/10*    (2006.01)
*G11B 27/00*    (2006.01)
*G10L 25/90*    (2013.01)

(52) U.S. Cl.
CPC ................ *G11B 27/00* (2013.01); *G10L 25/90* (2013.01); *G11B 27/005* (2013.01)

(58) Field of Classification Search
None
See application file for complete search history.

(56) References Cited

U.S. PATENT DOCUMENTS

| | | | | |
|---|---|---|---|---|
| 4,228,471 A * | 10/1980 | Shiga | ........................ | 360/73.06 |
| 8,612,031 B2 * | 12/2013 | Yamashita | ...................... | 700/94 |
| 2003/0165326 A1 | 9/2003 | Blair et al. | | |
| 2004/0267388 A1 | 12/2004 | Perdon | | |
| 2006/0127035 A1 * | 6/2006 | Shen et al. | ...................... | 386/68 |
| 2007/0261537 A1 | 11/2007 | Eronen et al. | | |
| 2008/0019240 A1 * | 1/2008 | Araki et al. | .................. | 369/47.1 |
| 2009/0069917 A1 | 3/2009 | Yamashita | | |
| 2010/0172626 A1 * | 7/2010 | Lee et al. | ........................ | 386/68 |
| 2011/0123173 A1 * | 5/2011 | Ruffini et al. | .................. | 386/249 |
| 2013/0019273 A1 * | 1/2013 | Ma et al. | ........................ | 725/90 |

FOREIGN PATENT DOCUMENTS

WO    93/24930 A1    12/1993

OTHER PUBLICATIONS

International Search Report and Written Opinion for Int'l. Patent Application No. PCT/EP2012/068064 (Feb. 19, 2013).

* cited by examiner

*Primary Examiner* — Thang Tran

(57) ABSTRACT

A method of playing a digital audio signal at a speed different from that at which it was recorded. The method comprises: playing a first segment of the signal; skipping to a second segment that is not contiguous with the first segment; and playing the second segment, wherein at least one of the first and second segment is played at a rate different from the rate at which it was recorded.

15 Claims, 4 Drawing Sheets

PLAYING AUDIO IN TRICK-MODES

This invention relates to playback of digital audio. It relates, in particular, to techniques for playing the audio in so-called "trick" modes, such as fast-forward or fast-rewind.

A digital audio signal comprises a sequence of digital samples representing recorded sound. A recording is characterised by a sampling rate—the number of samples per unit time—typically expressed as a frequency in Hz. For example, the sample rate used for audio Compact Discs is 44.1 kHz. To reproduce the recorded sound in normal playback, the samples are played at their native sampling rate—that is, the sampling rate at which they were recorded. Playing comprises converting the digital samples to an analogue signal using a Digital to Analogue Converter (DAC).

A variety of methods are known in the art for implementing fast-forward or fast-rewind of digital audio. A first method for fast-forward is to play a short segment, comprising a sequence of samples, and then to skip a successive segment. This is repeated as long as the player remains in fast-forward mode. By skipping contiguous groups of samples, the player achieves the effect of playing the audio signal in a shorter duration than it was recorded. The factor of speed increase is determined by the number of samples skipped, as compared with the number of samples played. To achieve a factor of 2, for example the length of each sequence played is equal to the length of each sequence skipped.

A second known method for fast-forwarding is to down-sample (decimate) the sequence of samples forming the audio signal. This typically involves anti-alias filtering, to attenuate high-frequencies, followed by sub-sampling. The resulting reduced number of samples is then played at the original sample rate. The increase in speed depends on how aggressively the signal is decimated. To achieve an increase in speed by a factor of 2, for example, alternate samples are kept and discarded—that is, half-rate decimation. This method results in an increase in the pitch of the audio, because the decimated samples are played at the original sample rate. Decimation by half results in a doubling in the frequencies heard by a listener.

Extensive effort has been devoted to eliminating pitch-shift, while still changing the rate at which the audio is played. For example, US 2003/0165326 describes a method for compensating for pitch-shift, during fast-forward playback.

According to an aspect of the present invention, there is provided a method of playing a digital audio signal at a speed different from that at which it was recorded, the method comprising:

playing a first segment of the signal;

skipping to a second segment that is not contiguous with the first segment; and playing the second segment, wherein at least one of the first and second segment is played at a rate different from the rate at which it was recorded.

In general, the method may comprise playing the audio signal faster or slower than it was originally recorded. However, the method may be particularly beneficial when playing the audio signal faster than normal. The method may comprise playing the audio signal forwards or in reverse (for example, in fast-forward or fast-rewind). According to the method, segments are skipped and the playback speed of a played segment is modified (compared with the original speed of the audio). Since the segment is played at a different rate, this means that the played duration of the segment is also different from the original recorded duration. For example, the segment may be played at a higher rate than the original recording, meaning that the duration of the segment when played is shorter than the recorded duration. Playback at a different rate may result in a shift in the pitch of the audio in the played segment.

The overall speed at which the audio signal is played is determined in part by the duration of each segment that is played, compared with the duration that is skipped. It is also determined in part by the rate at which the played segments are played. That is, the speed of the audio is changed by a combination of (i) skipping part of the audio and (ii) playing part of the audio at a different rate.

The present inventors have recognised that this combination of techniques can make the audio more intelligible to a human listener while the signal is being played at a different speed, compared with previous methods for trick-mode playback. This is advantageous in so-called "trick mode" playback. For example, if a user is fast-forwarding through the audio in order to search for a specific part, intelligibility of the sounds can help the user to more easily decide when they have found the part of the audio signal that they wish to listen to. If the user is not able to understand the audio while it is being fast-forwarded, the user may need to repeatedly revert to normal playback speed, to listen to the audio in order to discover whether it is near the desired time-instant. While fast-forwarding, the user may miss (overshoot) the desired point in the audio signal and may need to rewind in order to find it. The present method helps the user to avoid these frustrations.

In the step of skipping to the second segment, the position of the second segment in the audio signal is preferably calculated using as a reference position the position of the start of the first segment. This may enable the second segment to be easily and reliably located. As an alternative, the position of the second segment could be calculated using the end of the first segment as the reference; however, this may be more complicated, since the position of the end of the first segment will depend on the rate at which the first segment is played. This may make the latter approach inconvenient or computationally costly to implement.

The playback rate of the at least one segment may be chosen dependent upon the speed at which the audio signal is to be played.

It is advantageous for the playback rate to vary automatically, depending upon the overall speed at which the audio signal is intended to be played. That is, the playback rate is selected—at least in part—according to the desired speed. Thus, for example, when the speed of the audio is increased, the rate at which the segment is played may also increase. In some embodiments, the playback rate of the played segment determines the pitch-shift. Thus, in such embodiments, the pitch will increase when the desired speed of the audio is increased. This may match the user's intuitive expectations—for example, from experience of fast-forwarding or rewinding conventional analogue media such as magnetic cassette tapes.

The rate at which the at least one segment is played preferably depends upon the logarithm of the factor by which the speed of the audio is to be increased.

For example, if the audio is to be sped up by a factor of 2, the segment may be played at a rate that is dependent on a logarithm of 2.

The playback rate may be linearly related to the logarithm of the speed-factor.

For example, the rate at which the segment is played may be defined as $(1+K \log_2 n)$ times the originally recorded rate, where K is a constant and n is the factor by which the speed of the audio is to be changed.

Alternatively, the playback rate may be nonlinearly related to the logarithm of the speed-factor.

For example, the rate at which the segment is played may be defined as $(1+K \log_2 n)$ times the originally recorded rate, where n is the factor by which the speed of the audio is to be changed and K is a function of n, K=f(n). Here, the function f(n) may be a one-to-one function—that is, it can provide a unique value of K for each different value of n. The function can be defined in a lookup table, for example. The value of K is preferably in the range 0.1 to 0.4, more preferably 0.1 to 0.3, most preferably about 0.2. This should ensure good intelligibility of the audio content in most circumstances. In some embodiments, the value of K might be chosen randomly within a given range.

Overall, the playback rate is preferably changed by a factor in the range 1.1 to 3. That is, $1.1 \leq (1+K \log_2(n)) \leq 3$. More preferably, the factor by which the playback-rate is increased is in the range 1.1 to 2.

In some embodiments, the rate at which the at least one segment is played may depend at least in part upon the content of the audio signal.

Adapting the playback rate to the content may help to optimise the method for different types of audio signal. Depending on the content of the signal, a human listener may be more or less sensitive to a change in the rate and/or pitch shift when the segment is played. For example, if the originally recorded audio signal already contains relatively high-pitched signals, a significant rate increase may cause annoyance or the sounds may become unintelligible.

The rate at which the segment is played may be selected based on metadata associated with the audio signal.

Here, the content of the audio signal is inferred from the metadata and a suitable rate is chosen based on the results. For example, the rate may be chosen based on the gender of a singer whose voice is present in the audio signal, wherein a relatively higher playback rate is selected for a male voice, compared with a female voice. Metadata is commonly associated with digital audio signals—for example, audio files in the MPEG-1 or MPEG-2 Audio Layer III ("MP3") format may include metadata in ID3 format.

The method may further comprise detecting a pitch of content in the audio signal, wherein the rate at which the segment is played is selected based on the detected pitch.

This can avoid the need to analyse metadata to determine the content of the audio signal. It may be more accurate to measure pitch than to infer pitch from metadata tags. Furthermore, this method is applicable even when there is no metadata associated with the audio signal. It can also vary the playback rate of the played segments over time—for example, the playback rate for a male part of a duet may be different from the female part.

The playback rate of the at least one segment is preferably variable. Preferably the playback rate is variable at least in part independently of the speed at which the audio signal is to be played.

In some embodiments the playback rate may be completely independent of the speed, n, at which the audio signal is to be played. That is, the playback rate can be chosen arbitrarily (preferably within some predetermined range).

In other embodiments, the playback rate is dependent upon the speed, n, at which the audio signal is to be played. In this case, the playback rate may be additionally adjusted, independently of the speed. Thus, although the playback rate exhibits dependence upon speed, it is not uniquely determined by the speed—there is an additional degree of freedom. For example, if the rate at which the segment is played is determined by the formula $(1+K \log_2 n)$, the value of K may be variable by a user. Therefore, the rate depends on n, but the manner in which it depends on n can be adjusted by the user.

In another example, the rate at which the segment is played is determined by the formula $(1+K \log_2(n)+K_i)$. Here, the additive offset $K_i$ may be adjustable by the user. Thus, the rate depends on n, but can be further varied by a user.

This can allow a user to finely control the playback rate of the segment and thereby—in some embodiments—the pitch-shift applied to played segments of the audio signal. This is desirable because some types of audio may become unintelligible if they are played at a rate and/or shifted pitch very different from their original rate. The user may adjust the playback rate until the content is sufficiently clear.

In still other embodiments, the rate at which the at least one segment is played is a constant.

In this case, the playback rate of the played segment is fixed, independently of variations in the speed at which the audio signal is to be played. Consequently the change in speed is determined solely by the ratio between the duration of the played segments and the duration of the, skipped (not played) segments. This provides a simple implementation, because the playback apparatus does not need to cater for multiple different rates of playback at many different speeds. Here, the constant playback rate may be defined according to the equation $1 \pm C$, where C is a fractional constant.

In general, the speed at which the audio signal is to be played is preferably in the range 2× to 32×. That is, the factor by which the speed of the signal is increased is in the range 2 to 32.

The duration of the at least one segment played at a different rate is preferably in the range 300 ms to 700 ms, more preferably 400 ms to 600 ms, most preferably about 500 ms.

The first segment may be after the second segment in the audio signal, such that the step of skipping to the second segment comprises skipping backwards in the signal, and wherein each of the first and second segments is played in a forward direction.

This provides a beneficial way to implement fast-rewind. Each individual segment is played in the forward direction—that is, the order of samples played within a segment corresponds to the ordering of samples as they were recorded. This allows the sounds to be made intelligible to a human listener. In contrast, if the sounds were played backwards (samples in reverse order) it would be difficult to understand them—especially in the case of speech or song lyrics. Nevertheless, the ordering of the segments is reversed, so that each played segment is from a point earlier (further back in time) in the audio signal. This can enable the user to seek backwards through the audio while being able to understand the content of the audio at all times.

Each segment may comprise a sequence of samples and playing the segment at a different rate may comprise: playing the samples at a rate different from the sampling rate at which they were recorded; and/or changing the number of samples by decimation or interpolation and playing the changed number of samples.

Decimation and interpolation are examples of sample rate conversion. This alternative approach may be helpful if the actual rate at which samples are played is constrained. For example, some digital to analogue converters may support only one fixed sample rate or a limited selection of sample rates. In this case, sample rate conversion can be used to effectively change the rate at which the segment is played, by an arbitrary factor, independently of the rate at which the samples are played.

The samples which are played are preferably played in the same order that they were recorded. That is, each segment is preferably played in the forward direction, at a modified rate. However, it may also be possible to play the samples in reverse—for example, when rewinding, samples may be played backwards (compared with their normal temporal ordering).

Also provided is a computer program comprising computer program code means adapted to control a physical computing device to perform all of the steps of any preceding claim if said program is run on a computer; and such a computer program embodied on a computer readable medium.

According to a further aspect of the invention, there is provided an audio player apparatus adapted to play a digital audio signal at a speed different from that at which it was recorded, the apparatus comprising:

a file reader, operable to read the digital audio signal;
an audio renderer; operable to play the signal; and
a controller, adapted to control the file reader to
read a first segment of the signal;
skip to a second segment that is not contiguous with the first segment; and
read the second segment,
the controller being further adapted to control the renderer to play at least one of the first and second segment at a rate different from the rate at which that segment was recorded.

The audio player may further comprise a pitch detector, adapted to detect a pitch of content in the audio signal, wherein the controller is further adapted to select the rate at which the at least one segment is played dependent upon the detected pitch.

The invention will now be described by way of example with reference to the accompanying drawings, in which.

Figure 1:
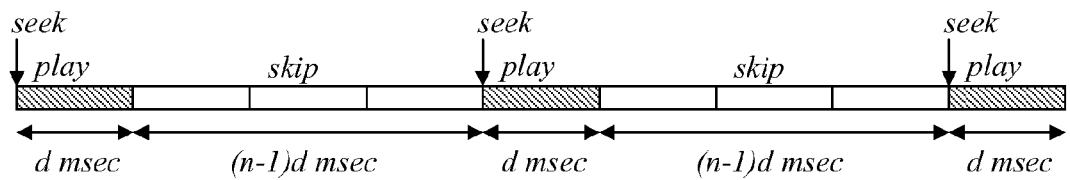
FIG. 1 is a timing diagram illustrating a 4× fast-forward trick mode according to a comparative example.

It should be noted that these figures are diagrammatic and not drawn to scale. Relative dimensions and proportions of parts of these figures have been shown exaggerated or reduced in size, for the sake of clarity and convenience in the drawings.

FIG. 1 shows an example of a fast-forward mode according to a comparative example. In this drawing, the horizontal axis denotes time index within a digital audio file, such as an MP3 file. The fast-forward mode operates by playing intermittent segments and skipping other segments of the file, between the played segments. A first segment of audio samples is played for a fixed duration of d milliseconds (ms). The succeeding segment, of duration (n−1)d ms, is skipped. Here, n is the trick-mode speed (such as 2×, 4×, . . . ). By playing d ms and skipping (n−1)d ms, the duration of the played audio is reduced by a factor of 1/n. That is, only d ms are played, for every nd ms of recorded audio in the file. The duration d of the played segments can be selected appropriately to enhance intelligibility. A very small d could be unintelligible. Experiments have shown that 300 ms to 700 ms is typically an appropriate range for d. The value used for the embodiments described below was 500 ms.

Figure 2:
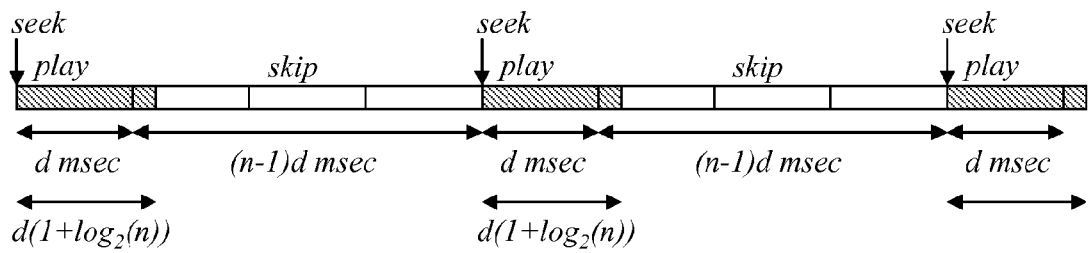
FIG. 2 is a timing diagram illustrating a 4× fast-forward trick mode according to an embodiment of the invention.

FIG. 2 shows an example of fast-forward according to an embodiment of the present invention. Here, in addition to skipping segments of the audio signal, those segments that are played are played at a rate different to the rate at which they were recorded. The original sampling rate is denoted $f_0$ and the modified playback rate of the samples is denoted $f_1$. In this embodiment, the samples in the played segments are played at $(1+K \log_2(n))$ times the sampling rate of the original samples where K is a fractional constant. That is:

$$f_1 = (1 + K \log_2(n)) f_0$$

Figure 3:
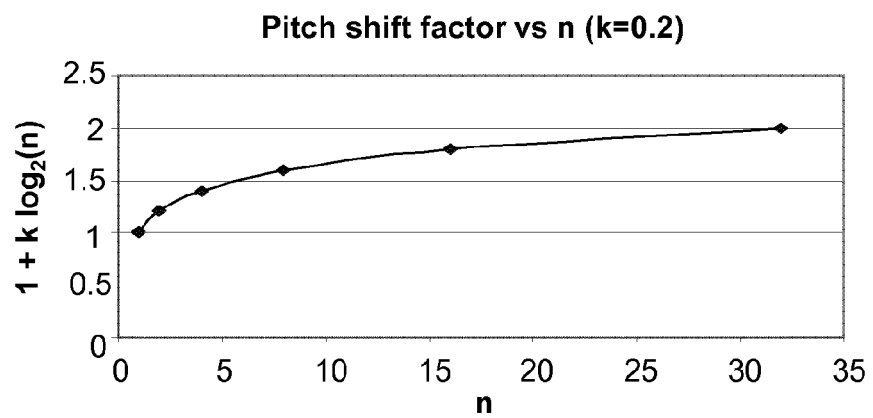
FIG. 3 is a graph showing a variation in pitch-shift factor for different playback speeds, according to an embodiment.

This gives the effect of shifting the pitch (frequency) of the sounds in the audio signal when they are played. The acoustic frequencies in the audio signal are increased in proportion to the increase in the sampling rate. The maximum values of K and n are chosen so as to limit the factor $(1+K \log_2(n))$ to a maximum of between 2 and 3. Experiments have revealed that a pitch-shift factor greater than 2 can cause the content of typical audio signals to become unintelligible. FIG. 3 shows a plot of pitch-shift factor against trick-mode speed n, for K=0.2.

When K is a constant, as in this example, the pitch-shift is linearly related to the logarithm of the speed factor, n. Note that pitch-shift ratio is identically equal to the ratio between the playback sampling-rate (the rate at which samples are played) and the sampling-rate used to record the audio signal.

Since the samples are played for a fixed duration of d ms at a modified sample rate $f_1$, the duration of samples played corresponds to $d(1+K \log_2(n))$ ms at the original (recorded) sampling rate, $f_0$. This is a desirable feature since the actual number of samples played as the pitch shifts higher increases proportionally, which helps improve the intelligibility. However, the skipping of the samples must maintain exactly the ratio (n−1)d:d between the duration of the segments skipped (measured at the original sampling rate) and the actual duration of the segments played.

This is achieved by a method of seeking to absolute time in the stream. The player first seeks to some location in the stream (say original position) at which it is desired to start using the trick mode. The stream is then played for d ms in real time. Then, at the end of playing d ms the player seeks again to original position+(d+(n−1)d) $f_0$ samples. In other words, the reference point for the seek operation is the start, original position, of the played segment, rather than the end. The seek operation measures n d $f_0$ samples from original position. Thus, seeking to absolute time in the stream solves the above problem.

Figure 4:
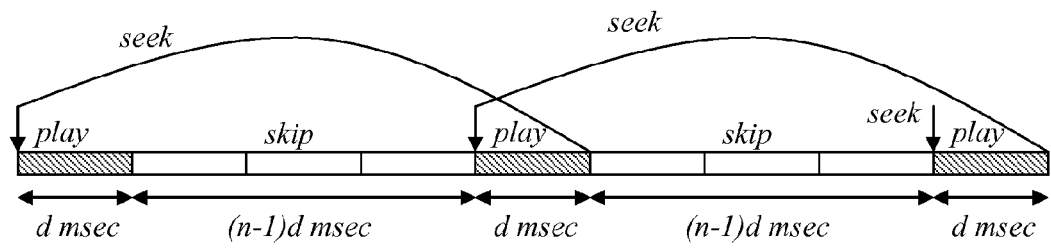
FIG. 4 is a timing diagram illustrating a 4× fast-rewind trick mode according to a comparative example.

FIG. 4 illustrates a trick mode employing fast-rewind, according to a comparative example. This method is similar to the fast-forward of FIG. 1. A segment of the audio signal is played and then the player skips to another non-contiguous segment. The difference from FIG. 1 is that successive played segments are displaced backwards in time from one another. That is, the next played segment is from a time-instant before the previously played segment. This implements a rewind or reverse-seek in the audio signal.

Figure 5:
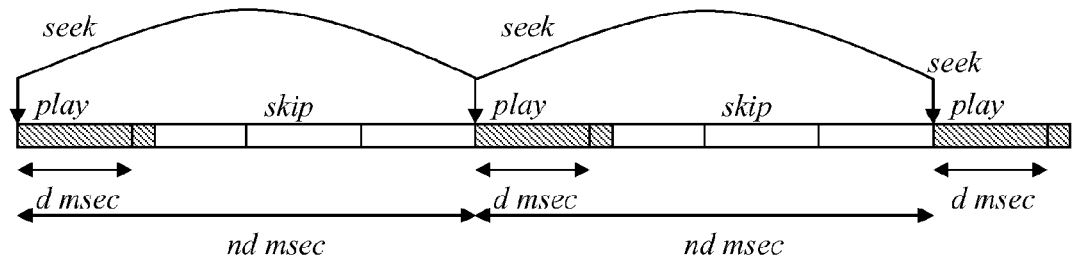
FIG. 5 is a timing diagram illustrating a 4× fast-rewind trick mode according to an embodiment of the invention.

Implementing the mechanism of FIG. 4 is complicated when pitch-shifting is used, according to the present invention. FIG. 5 is a diagram illustrating a fast-rewind trick mode according to an embodiment of the invention. It is similar to the fast-forward method illustrated in FIG. 2—the playing speed is changed by skipping segments and by playing the remaining segments at a modified sampling rate.

Similarly to FIG. 2, the method solves the difficulties caused by pitch-shift by seeking to absolute time positions with the new position calculated from previous seek positions (that is, the start of the previously-played segment, rather than the end). Here, the previous seek position is stored and the new position is calculated as shown below new position=previous position−nd if(new position>0)
  seek to new position This method is independent of the duration of the played segment and therefore works even when a different sample rate is used for playback.

Experiments suggest that that the intelligibility during fast-rewind is not as good, when compared with fast-forward with similar parameters. Nevertheless, it is believed that this is fundamentally due to the human perception of the sounds, rather than any particular disadvantage of the present method.

Figure 6:
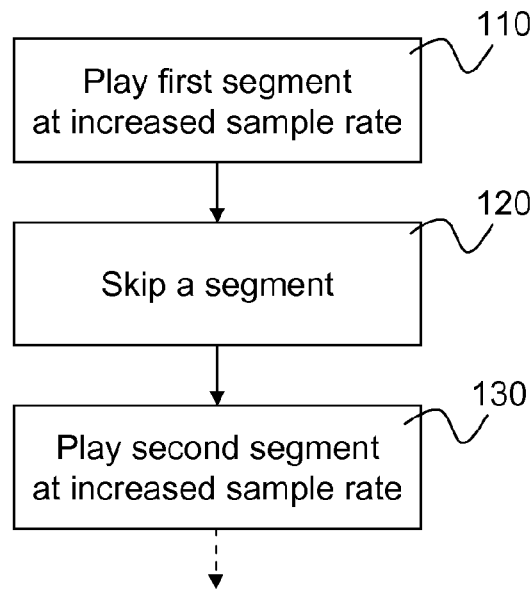
FIG. 6 is a flowchart illustrating a method according to a first embodiment of the invention.

An exemplary embodiment of the invention will now be described with reference to FIGS. 6 and 7. FIG. 6 is a flowchart of a method and FIG. 7 is a block diagram of an apparatus which implements the method.

Figure 7:
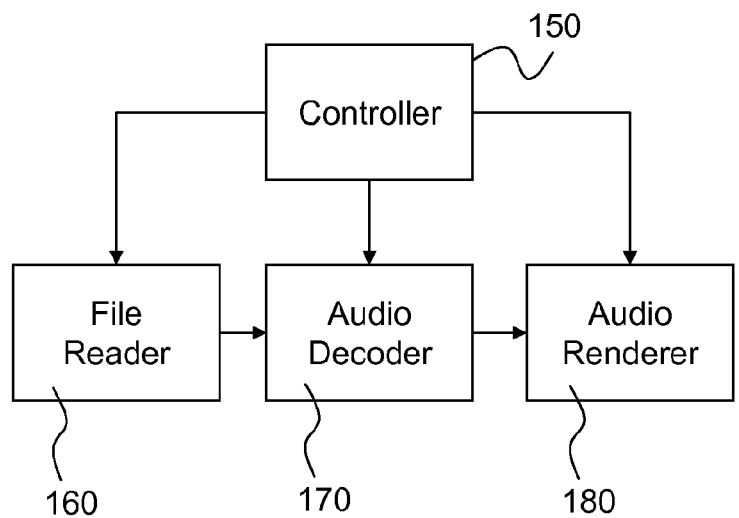
FIG. 7 is a block diagram of an apparatus adapted to implement the method of FIG. 6.

The audio playback apparatus of FIG. 7 comprises a file reader 160; audio decoder 170; and audio renderer 180. These are under the control of a controller 150. The output of the file reader 160 is coupled to the input of the audio decoder 170; the output of the decoder 170 is coupled to the input of the audio renderer 180. The file reader 160 reads the digital audio signal from an MP3 file. The controller 150 controls the reader 160 to read specific parts of the file. The decoder 170 receives the digital audio signal from the file reader 160 and decodes it. The decoding can comprise a conventional process of decoding MP3 audio. The audio renderer 180 receives decoded audio from the decoder 170 and plays it.

When the player is operated in a trick mode (such as fast-forward or fast-rewind), the controller 150 controls the file reader 160 to read a first segment of the signal from the MP3 file. This is decoded by the decoder 170 and played by the renderer (step 110 of FIG. 6). The controller controls the audio renderer 180 so that the first segment is played at an increased sample rate, compared with the sample rate of the original recording.

The controller controls the file reader 160 to seek to a different part of the MP3 file, skipping a segment (step 120). The file reader then reads a second segment. Once again, the read segment is decoded by the decoder 170 and played by the renderer 180 at an increased sample rate (step 130). This process of playing a segment and skipping to another segment is repeated as long as the audio player is in the trick mode. In this way, playback at increased speed is achieved.

The positions in the audio file to which the reader 160 seeks; the duration of each segment; and the modified sample rate are determined as previously explained above.

Further experiments were done to check the intelligibility of the audio, when using the trick mode, for different types of audio content. It was found that different values of K were appropriate for male and female voices. In particular, when K was tuned for a male voice, the same value would not be acceptable for female singers who have higher-pitched voices. At speeds of 16× and 32× the result would be too "squeaky" and could be unpleasant to listen to. The inventors recognized the need to tune the K based on the pitch of the singer. Two approaches are defined to solve this problem.

In a first approach, metadata of the audio file is inspected to infer the gender of the singer. A table is provided in a memory in the audio player, in which each artist is associated with a value of K. When the file reader 160 reads an MP3 file, it inspects the metadata contained in ID3 tags to determine the artist. This artist is then looked up in the table, in order to determine the correct value of K. This ensures that a suitable sample rate is used for playback.

Figure 8:
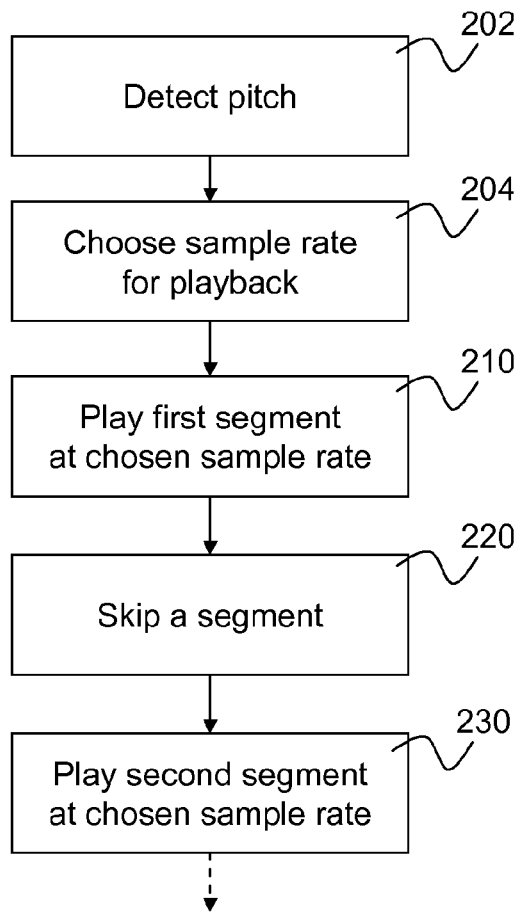
FIG. 8 is a flowchart of a method according to a second embodiment of the invention.
Figure 9:
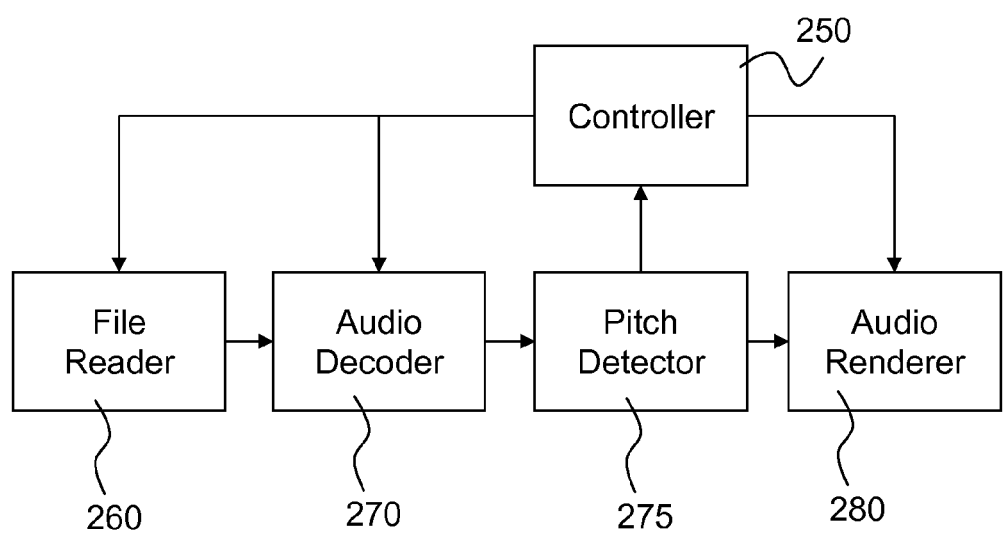
FIG. 9 is a block diagram of an apparatus according to the second embodiment.

In a second approach, the audio player detects the pitch of the audio signal automatically and adapts K directly, based on the detected pitch. An embodiment of the invention using this method will now be described with reference to FIGS. 8 and 9. In the block diagram of FIG. 9, the file reader 260; audio decoder 270; and audio renderer 280 are substantially similar, respectively, to the file reader 160; audio decoder 170; and audio renderer 180 of the first embodiment, described above.

The audio player comprises a pitch detector 275. The input of the pitch detector 275 is coupled to the output of the audio decoder 270 and the output of the pitch detector 275 is coupled to the input of the audio renderer. The controller 250 receives the detected pitch from the pitch detector 275.

Similarly to the first embodiment, the controller 250 controls the file reader 260 to read a first segment from the file. This is decoded by decoder 270. The pitch detector 275 processes the first segment of the audio signal to determine the pitch (frequency) of the audio content (step 202). Methods for pitch detection will be familiar to those skilled in the art. In general the method of the present invention is not sensitive to the choice of pitch detection method. All that is needed is an approximate estimate of the dominant pitch of the audio. Conventional time domain or frequency domain pitch-detection may be used. For example, pitch can be detected by cepstrum analysis.

The controller 250 uses the detected pitch value to determine a suitable value of K. This can be done using a predefined lookup table which maps different pitch-intervals to suitable values of K. In such a table, increasing pitch will be associated with decreasing values of K. For a male vocal, a value of K=0.2 has been found to be suitable. For a high-pitched female vocal, a value of K=0.1 has been found to be suitable. Using the chosen value of K, the sample rate for playback of the first segment is determined (step 204), using the equations presented previously above. The controller 250 then controls the renderer 280 to play the first segment at the chosen sample rate (step 210).

In step 220, the controller controls the file reader to skip to another segment. This step is similar to step 120 of FIG. 6. The method is then repeated, by reading, decoding and playing a second segment, in step 230.

Note that the detected pitch of the first segment and the detected pitch of the second segment may be different from one another. For example, the first segment of the audio signal may contain a male voice and the second segment may contain a female voice. In this case, the second segment may be played at a lower sample rate than the first segment. This real-time adaptation is an advantage over a method of pitch detection which relies only on metadata of the audio file. For example, the adaptive method can vary the sample rate during duet songs (with both male and female voices singing alternately). The adaptive method is also beneficial when the audio file does not contain any metadata, because it is independent of any knowledge about the artist.

Methods according to the present invention can be applied in all systems which play digital audio. These include but are not limited to DVD or CD players; and MP3/AC3/WMA portable media players. The invention can also be used for analogue audio signals, such as analogue radio transmissions, if the receiver-device converts the analogue audio signal to digital form and stores (buffers) it.

In the embodiments described above, audio segments are played at modified sample rates. Many existing audio systems use very powerful audio renderers such as over-sampled interpolation Digital-to-Analogue Converters (DACs), capable of accepting samples rates form 8 to 100 kHz without difficulty. With such systems and a suitable DAC controller it is possible to play audio at custom sample rates, as described above.

Alternatively, if the DAC supports only a single fixed sample rate, then an interpolating Sample Rate Converter (SRC) may be required to convert from different sampling rates to this fixed sampling rate. In this way, the invention can also be implemented with DACs which do not support playback at variable sample rates.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the rate at which each segment is played can be defined differently. Two such variations will now be described.

In a first variation, the factor by which the sample rate is increased is chosen using the formula $(1+K \log_2(n))$. However, the value of K is varied for different speeds n. This results in a pitch shift that is varied not only with respect to speed but also with the variable $K_i$. Thus the pitch shift factors can be calculated as $(1+K_i \log_2(n_i))$ for each speed $n_1, n_2 \ldots n_{max}$. The values of $K_i$ are preferably in the range 0.1 to 0.4.

In a second variation, the factor by which the sample rate is increased is chosen using the formula $(1+K \log_2(n)+K_i)$. That is, a small fractional offset is added to the basic formula $(1+K \log_2(n))$. The offset values $K_i$ can be chosen dependent on n. The resulting factor $(1+K \log_2(n)+K_i)$ can be in the range 1.1 to 3. This has been found in experiments to produce acceptable results.

Methods according to the present invention could be combined with pitch compensation techniques. This may allow each played segment to be played at a different rate (for example, faster than it was recorded) without the listener perceiving a pitch shift. Pitch compensation techniques are known in the art.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of playing a digital audio signal at a speed different from that at which it was recorded, the method comprising:
    playing a first segment of the digital audio signal;
    skipping to a second segment of the digital audio signal that is not contiguous with the first segment; and
    playing the second segment,
    wherein at least one of the first and second segments is played at a rate different from the rate at which the at least one of the first and second segments was recorded, and wherein the rate is sample rate.

2. The method of claim 1, wherein the played rate of the at least one of the first and second segments is chosen dependent upon the speed at which the digital audio signal is to be played.

3. The method of claim 2, wherein the rate at which the at least one of the first and second segments is played depends upon an logarithm of a speed factor by which the speed of the digital audio signal is to be increased.

4. The method of claim 3, wherein the played rate is linearly related to the logarithm of the speed-factor.

5. The method of claim 3, wherein the played rate is non-linearly related to the logarithm of the speed-factor.

6. The method of claim 1, wherein the rate at which the at least one of the first and second segments is played depends at least in part upon the content of the digital audio signal.

7. The method of claim 6, wherein the rate at which the at least one of the first and the second segments is played is selected based on metadata associated with the digital audio signal.

8. The method of claim 6, further comprising detecting a pitch of content in the digital audio signal,
    wherein the rate at which the at least one of the first and second segments is played is selected based on the detected pitch.

9. The method of claim 1, wherein the played rate of the at least one of the first and second segments is variable, at least partly independently of the speed at which the digital audio signal is to be played.

10. The method of claim 1, wherein the rate at which the at least one of the first and second segments is played is a constant.

11. The method of claim 1, wherein the first segment is after the second segment in the digital audio signal, such that the step of skipping to the second segment comprises skipping backwards in the digital audio signal, and
    wherein each of the first and second segments is played in a forward direction.

12. The method of claim 1, wherein each of the first segment and the second segment comprises a sequence of samples and wherein playing the at least one of the first and second segments at a different rate comprises:
    playing the sequence of samples at a rate different from the rate at which they were recorded; and
    changing a number of samples in the sequence of samples by decimation or interpolation and playing the changed number of samples.

13. A non-transitory computer readable media comprising programming instructions which when executed by a processor perform an operation of playing a digital audio signal at a speed different from that at which it was recorded, the operation includes:
    playing a first segment of the digital audio signal;
    skipping to a second segment of the digital audio signal that is not contiguous with the first segment; and
    playing the second segment,
    wherein at least one of the first and second segment is played at a rate different from the rate at which it was recorded, and wherein the rate is sample rate.

14. Audio player apparatus to play a digital audio signal at a speed different from that at which it was recorded, the apparatus comprising:
    a file reader, operable to read the digital audio signal;

an audio renderer; operable to play the digital audio signal; and a controller, configured to control the file reader to
- read a first segment of the digital audio signal;
- skip to a second segment of the digital audio signal that is not contiguous with the first segment; and
- read the second segment, wherein the controller being further configured to control the renderer to play at least one of the first and second segments at a rate different from the rate at which the at least one of the first and second segments was recorded, and wherein the rate is sample rate.

15. The audio player apparatus of claim 14, further comprising a pitch detector, configured to detect a pitch of content in the digital audio signal, wherein the controller is further configured to select the rate at which the at least one of the first and second segments is played dependent upon the detected pitch.

* * * * *